US010280105B2

(12) United States Patent
Smith et al.

(10) Patent No.: US 10,280,105 B2
(45) Date of Patent: May 7, 2019

(54) APPARATUS AND METHODS FOR PRODUCING FLOAT GLASS HAVING REDUCED DEFECT DENSITY

(76) Inventors: Charlene S. Smith, Lower Burrell, PA (US); George A. Pecoraro, Lower Burell, PA (US)

( * ) Notice: Subject to any disclaimer, the term of this patent is extended or adjusted under 35 U.S.C. 154(b) by 738 days.

(21) Appl. No.: 11/760,194

(22) Filed: Jun. 8, 2007

(65) Prior Publication Data

US 2007/0227190 A1  Oct. 4, 2007

Related U.S. Application Data

(63) Continuation of application No. 10/672,026, filed on Sep. 26, 2003, now abandoned.

(60) Provisional application No. 60/414,516, filed on Sep. 27, 2002.

(51) Int. Cl.
| | |
|---|---|
| C03B 5/04 | (2006.01) |
| C03B 18/20 | (2006.01) |
| C03B 5/235 | (2006.01) |
| C03B 18/18 | (2006.01) |
| C03C 3/087 | (2006.01) |

(52) U.S. Cl.
CPC ............ *C03B 18/20* (2013.01); *C03B 5/2353* (2013.01); *C03B 18/18* (2013.01); *C03C 3/087* (2013.01); *Y02P 40/55* (2015.11); *Y02P 40/57* (2015.11)

(58) Field of Classification Search
CPC ................................ C03B 18/18; C03B 18/20
USPC ............. 65/134.4, 99.1, 99.2–99.6, 32.1, 90, 65/182.3–182.5
See application file for complete search history.

(56) References Cited

U.S. PATENT DOCUMENTS

| | | | | |
|---|---|---|---|---|
| 3,337,319 A * | 8/1967 | Edwards | ................. | C03B 18/18 65/182.3 |
| 3,337,322 A * | 8/1967 | Taylor | .................... | C03B 18/18 65/182.3 |
| 3,356,476 A * | 12/1967 | Gulotta | ................... | C03B 18/20 165/104.16 |
| 3,462,253 A * | 8/1969 | Sensi | ...................... | C03B 18/20 65/157 |
| 3,584,475 A * | 6/1971 | Galey | ..................... | C03B 15/04 65/169 |
| 3,607,203 A * | 9/1971 | Fujimoto | ............... | C03B 18/06 65/182.3 |
| 3,615,315 A * | 10/1971 | Michalik | ................. | C03B 18/02 65/119 |
| 3,622,295 A * | 11/1971 | Loukes | ................... | C03B 18/14 204/515 |
| 3,630,701 A * | 12/1971 | Javaux | .................... | C03B 18/22 65/168 |
| 3,630,703 A * | 12/1971 | Jones | ...................... | C03B 18/14 65/30.13 |
| 3,790,361 A * | 2/1974 | Lawrenson | ............. | C03B 18/16 269/310 |
| 3,881,905 A * | 5/1975 | Cramer | ................... | C03B 18/12 65/99.4 |
| 4,015,966 A * | 4/1977 | Weaver | ................... | C03C 3/078 501/62 |
| 5,364,435 A * | 11/1994 | Nelson | .................... | C03B 18/20 65/157 |
| 5,925,158 A * | 7/1999 | Weber | .................... | B01D 53/04 65/157 |
| 6,532,771 B1 * | 3/2003 | Kobayashi et al. | ......... | 65/134.4 |
| 6,997,018 B2 * | 2/2006 | Sakoske | ................. | C03B 18/14 65/60.2 |
| 8,020,409 B2 * | 9/2011 | Ban | ......................... | C03B 18/16 65/157 |
| 2002/0059811 A1 * | 5/2002 | Landa et al. | ..................... | 65/45 |

FOREIGN PATENT DOCUMENTS

| | | | | |
|---|---|---|---|---|
| DE | 1596419 B1 * | 10/1970 | ............ | C03B 18/20 |
| JP | 11310421 A | * | 11/1999 | |

OTHER PUBLICATIONS

English Language Machine Translation of JP-11-310421A—Obtained from PAJ website on Nov. 28, 2011.*
English language machine translation of DE 1596419 B1 via translate.google.com.*
English language human translation of Floatglas (DE 1596419B1).*

* cited by examiner

*Primary Examiner* — Jason L Lazorcik

(57) ABSTRACT

A float glass chamber and related methods include a hot section having an atmosphere in at least the lower plenum with less than 3 percent hydrogen based on volume and a cold section having a different volume percent hydrogen.

20 Claims, 1 Drawing Sheet

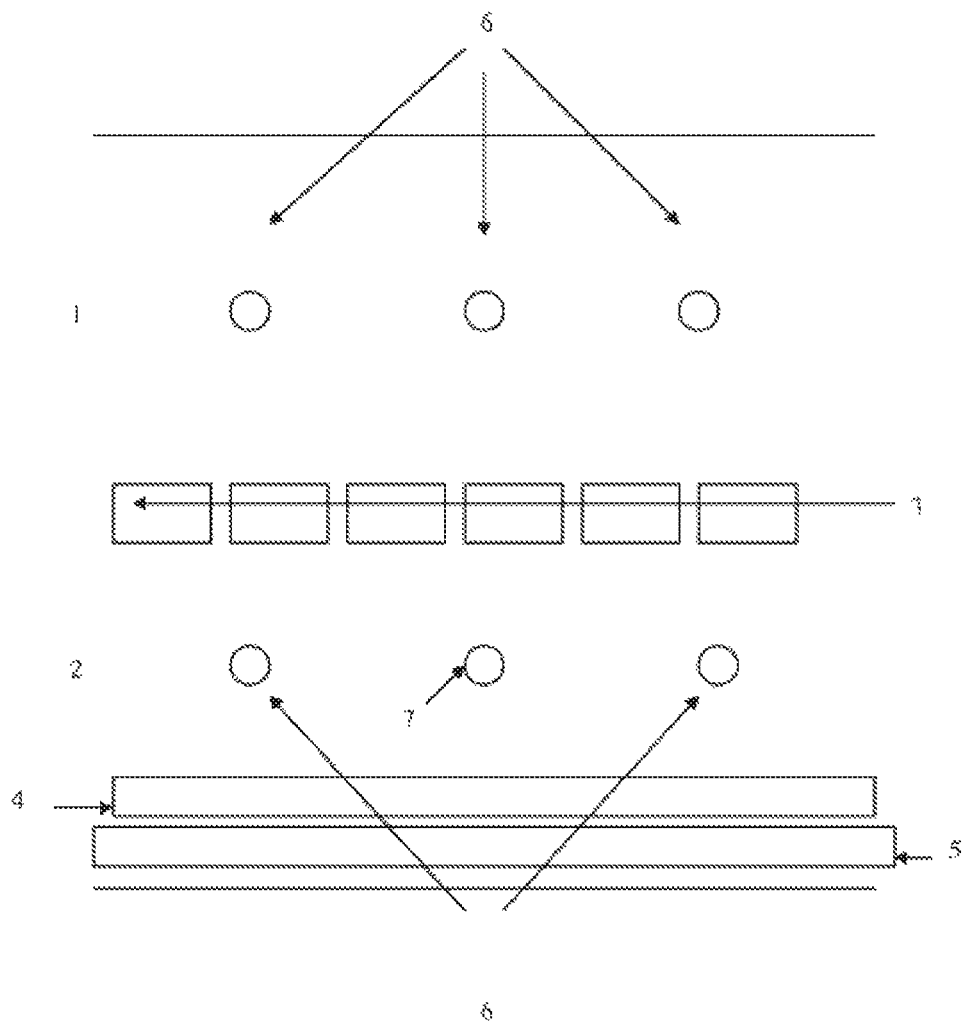
PRIOR ART

APPARATUS AND METHODS FOR PRODUCING FLOAT GLASS HAVING REDUCED DEFECT DENSITY

RELATED APPLICATIONS

This application claims priority to U.S. application Ser. No. 10/672,026, filed Sep. 26, 2003, which claimed the benefits of U.S. Provisional Application Ser. No. 60/414,516 filed Sep. 27, 2002, both which applications are herein incorporated by reference in their entirety.

FIELD OF THE INVENTION

The present invention relates to a float glass chamber used to produce flat glass by the float glass process, and more specifically float glass chambers that can be used to yield glass having reduced defect density.

BACKGROUND

The float glass process is well known for making sheets of glass. In a typical float glass process, batch materials are heated to form molten glass. The molten glass is then poured onto a bath of molten tin. The molten glass is drawn along the bath of molten tin and simultaneously cooled and attenuated to form a dimensionally stable continuous sheet of glass, typically referred to as a glass ribbon. The sheet is then removed from the bath for further processing.

Two types of furnaces are used in the float glass process, an air-fuel furnace and an oxy-fuel furnace. In an air-fuel furnace, fuel is mixed with warm air and combusted to provide heat to melt the glass batch materials.

In an oxy-fuel furnace, oxygen, not air, supports combustion. As a result, an oxy-fuel furnace provides a much more efficient melt than an air-fuel furnace because energy is no longer being wasted heating up nitrogen in the air and oxy-fuel flames have a higher flame temperature that radiates more efficiently. The increased melting efficiency allows more tonnage to be processed through an oxy-fuel furnace than through a similarly sized air-fuel furnace.

Both air-fuel and oxy-fuel furnaces have water in their atmospheres. The head space (the area of the furnace above the molten glass) in an oxy-fuel furnace has a higher concentration of water than in an air-fuel furnace because the oxy-fuel atmosphere lacks the nitrogen provided in an air-fuel furnace that dilutes the total water formed by combustion. Stoichiometrically, the water typically constitutes about 66% by volume of the head space in an oxy-fuel furnace versus 18% in an air-fuel furnace. Since the amount of water in the glass melt is proportional to the square root of the concentration of water in the head space, glass melted in an oxy-fuel furnace has a 1.7 to 2 times higher water concentration than glass melted in a conventional air-fuel furnace. Typically, glass melted in an oxy-fuel furnace contains more than 0.045 weight percent water based on the total weight of the composition.

At the stage of the float glass process where molten glass is poured onto molten tin, the molten tin temperature in the float bath ranges from 1800° F. to 1900° F. (981° C. to 1037° C.). At 1800° F., at the glass-tin interface, water that diffuses out of the molten glass dissociates into hydrogen and oxygen. Because hydrogen is not very soluble in tin at 1800° F., much of the hydrogen does not dissolve in the tin but remains in the atmosphere of the bath. Some of the hydrogen from the disassociation of water gets trapped at the interface between the molten glass and tin and ultimately impinges on the bottom surface of the glass ribbon and form defects along the ribbon surface typically referred to as open bottom bubbles. The open bottom bubbles can be described as voids in glass that generally have an inverted U-shaped cross section. The presence of open bottom bubbles increases the overall defect density of the glass.

Customers set requirements for the defect density of glass for certain applications. The standards are very difficult to meet with conventional float glass processes due to the presence of open bottom bubbles.

The present invention provides a novel apparatus and method that yields float glass having a lower total defect density as a result of reduced open bottom bubble defects.

SUMMARY OF THE INVENTION

In one embodiment, the present invention is a float glass chamber comprising:
a hot section (first chamber section) having an atmosphere in at least a lower plenum comprising less than 3 percent hydrogen based on volume; and
a cold section (second chamber section), wherein the boundary line between the hot section and the cold section is where the temperature of the glass falls below a threshold temperature.

In another embodiment, the present invention is a method for making float glass with reduced defect density comprising:
a. melting a glass composition to form a glass melt; and
b. pouring the glass melt in a float chamber having a hot section and a cold section, the boundary line between the hot section and the cold section is where the temperature of the glass falls below a threshold temperature,
wherein the hot section has an atmosphere in at least a lower plenum comprising less than 3 percent hydrogen based on volume.

DRAWING

FIG. 1 is a sectional view of a float chamber according to the present invention, with portions removed for clarity.

DESCRIPTION OF THE INVENTION

As used herein, spatial or directional terms, such as "left", "right", "inner", "outer", "above", "below", "top", "bottom", and the like, relate to the invention as it is shown in the drawing FIGURE. However, it is to be understood that the invention may assume various alternative orientations and, accordingly, such terms are not to be considered as limiting.

Unless otherwise indicated, all numbers expressing dimensions, physical characteristics, quantities of ingredients, reaction conditions and so forth, used in the specification and claims are to be understood as being modified in all instances by the term "about". Accordingly, unless indicated to the contrary, the numerical values set forth in the following specification and claims can vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. Moreover, all ranges disclosed herein are to be understood to encompass any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more and ending with a maximum value of 10 or less, e.g., 5.5 to 10 or 3.2 to 7.8.

Conventional float glass processes are typically carried out using a float chamber as shown in FIG. 1. Non-limiting examples of float glass processes are disclosed in U.S. Pat. No. 3,083,551, U.S. Pat. No. 3,961,930, and U.S. Pat. No. 4,091,156, which are all herein incorporated by reference.

In a conventional float glass process, a glass batch composition is heated to a molten state and poured into the float chamber. Typically, the float chamber has a refractory roof 3 that divides the chamber into an upper plenum 1 and a lower plenum 2. The lower plenum contains the glass 4 and the tin 5. The upper plenum contains all of the overhead electrical heating elements to provide controlled heating of the liquid metal float bath and the formed glass ribbon. A controlled atmosphere is maintained in the chamber via gas inlets and outlets 6 and 7.

The novel float glass chamber of the present invention comprises at least two sections, a hot section and a cold section. The boundary line between the hot section and the cold section is where the temperature of the glass falls below a predetermined temperature, hereinafter referred to as the "threshold temperature". In a non-limiting embodiment of the present invention, there is no physical barrier between the hot section and the cold section.

In one non-limiting embodiment of the invention, the threshold temperature is 2100° F. In another non-limiting embodiment of the invention, the threshold temperature is 1800° F. In another non-limiting embodiment of the invention, the threshold temperature is 1600° F. The lower the threshold temperature for the hot section, the larger the hot section and the smaller the cold section and vice versa.

In a non-limiting embodiment of the present invention, the hot section of the chamber is approximately 90 to 100 feet from the point where the molten glass is poured onto the tin. The cold section of the chamber is the next approximately 70 to 140 feet of chamber behind the hot section, depending on the size of the bath.

In a non-limiting embodiment of the present invention, numerous gas inlets and outlets are present in the upper plenum and lower plenum of the float chamber. Various gaseous mixtures can be pumped into the chamber through the gas inlets or out of the chamber through the gas outlets to control the atmosphere within the chamber.

In a non-limiting embodiment of the invention, the gas inlets to at least the lower plenum over the hot section of the chamber deliver in a gas comprising less than 1 weight percent hydrogen based on volume. The remainder of the gas can be an inert gas, such as but not limited to nitrogen. Under normal operating conditions, in one non-limiting embodiment of the present invention, the atmosphere of the lower plenum over the hot section of the chamber can comprise 3 percent hydrogen based on volume. In another non-limiting embodiment of the present invention, the atmosphere of the lower plenum over the hot section of the chamber can comprise 1 percent hydrogen based on volume.

Various mixtures of hydrogen and nitrogen or argon or ammonia in place of mixed gases can be pumped into the atmosphere of at least the lower plenum over the cold section of the chamber. In a non-limiting embodiment of the invention, the gaseous mixture can comprise up to 10 percent hydrogen based on volume. The rest of the gas can be nitrogen.

The gas outlets in the float chamber can be used to remove gas from the chamber. In one non-limiting embodiment of the invention, up to 40 volume percent based on volume of the total flow of the gas pumped into the chamber as discussed above can be removed from the hot section. In this embodiment, it may be necessary to adjust the level of nitrogen in the atmosphere to prevent hydrogen from flowing upstream into the hot section of the chamber.

By reducing the hydrogen in the hot section of the float chamber, the present invention reduces the level of saturation of molten tin, specifically with respect to hydrogen, at the hot section of the float chamber. The molten tin is able to dissolve more hydrogen from the disassociation of water so open-bottom bubble defects in the glass are reduced.

The present invention also encompasses a method for producing glass. According to the present invention, glass can be produced via the following steps: adding glass batch materials to a furnace; melting the batch materials; pouring molten glass from the furnace into the float chamber; and removing the float glass from the float chamber.

The first step of the present invention comprises adding glass batch materials to a furnace. The furnace can be an air-fuel furnace or an oxy-fuel furnace. The glass batch materials can be of any conventional type including, but not limited to, conventional soda-lime-silica glass batch materials. A conventional glass composition can be characterized as follows:

from 65 to 75 weight percent $SiO_2$;
from 10 to 20 weight percent $Na_2O$;
from 5 to 15 weight percent CaO;
from 0 to 5 weight percent MgO;
from 0 to 5 weight percent $Al_2O_3$
from 0 to 5 weight percent $K_2O$; and
from 0 to 2 weight percent $Fe_2O_3$.

All values are in weight percent based on the total weight of the glass composition.

The second step of the present invention comprises melting the batch materials in the furnace. The melting processes can be accomplished using techniques that are well known in the art. For example, in an oxy-fuel furnace, the batch materials can be melted by supplying oxygen and fuel to melt the batch materials.

The third step of the present invention involves pouring molten glass from the furnace into the float chamber. As is well known in the art, the molten glass flows onto the top of the molten tin and moves along the top of the tin from the hot section of the chamber to the cold section of the chamber. The temperature of the glass in the hot section and the cold section of the chamber are as discussed above. Also, the environments above the glass in the hot section and the cold section of the chamber are as discussed above.

The glass melt coming into the tin bath can contain water. The glass melt can have a water content equal to or greater than 0.045 weight percent based on the total weight percent of the composition.

The next step of the invention involves removing the float glass from the bath as is well known in the art.

After the float glass is removed from the float chamber, the glass is controllably cooled and cut into glass sheets. The sheet can be further processed, e.g. cut to shape and heat processed, to form a desired glass article.

The glass can also be coated. In a non-limiting embodiment of the invention, the glass is coated. The coating can include one or more coating layers and/or coating films. The coating can be of any desired type. For example, but not to be considered as limiting, the coating can be an electroconductive coating, a heatable coating, an antenna coating, or a solar control coating, such as a low emissivity coating. Non-limiting examples of solar control and antenna coatings are disclosed in U.S. Pat. Nos. 4,898,789; 5,821,001; 4,716,086; 4,610,771; 4,902,580; 4,716,086; 4,806,220; 4,898,790; 4,834,857; 4,948,677; 5,059,295; and 5,028,579, which patents are herein incorporated by reference. Non-limiting examples of electroconductive coatings are disclosed in U.S. Pat. Nos. 5,653,903 and 5,028,759, which are herein incorporated by reference.

Glass made by a float process typically ranges from a sheet thickness of 2 millimeter to 20 millimeters. Glass having the aforementioned thickness can be prepared on a conventional float line having a line speed ranging from 100 to 800 inches per minute. The required thickness of the glass is determined by the end use of the glass.

The present invention provides glass having reduced defect density, specifically open bottom bubbles. Such defects in the glass can be measured using on-line and off-line methods. An Automatic Inspection System manufactured by Inspection Technologies Inc. can be used to measure defects on-line. Defects can be measured off-line by visual inspection. The defect density of glass is measured as number of defects per 100 square feet. The standards for measuring defects in glass are well known in the art. For example, defects can be measured in categories from <0.06" to >0.25".

Glass produced according to the present invention can meet the various commercial standards for defect density. For example, car manufacturers set standards for defect density for automotive windshields. One automobile manufacturer requires automotive windshield glass production to have less than 1 total defect per 100 square feet.

The glass produced according to the present invention can be used as automotive transparencies, in colored glasses, laminated products, etc. as is well known in the art. A laminated product can comprise at least one piece of glass produced according to the present invention. Such a laminated product can be a windshield.

EXAMPLES

The invention is illustrated by the following non-limiting examples. The following is an example of a control run where hydrogen was in the lower plenum of the hot end and a run according to the present invention.

|  | Control | Example of the Invention |
| --- | --- | --- |
| $H_2$ in total chamber | 1900 scfh | 600 scfh |
| $H_2$ in at least lower plenum of hot end | 1300 scfh | 0 scfh |
| Open Bottom Bubble defects | 1.36 per 100 sq. ft. | 0.07 per 100 sq. ft. |
| Thickness of glass | 3 mm | 3 mm |
| Tonnage | 599 Tons per day | 604 TPD |
| Threshold Temperature | 1769° F. | 1761° F. |
| $H_2O$ in glass | 0.049% | 0.049% |

The apparatus and method of the present invention allow float glass to be produced which has substantially reduced open bottom bubble defects as compared to conventional float glass.

The above examples are offered only to illustrate the present invention. The scope of the present invention is defined by the following claims.

What is claimed is:

1. A method for making float glass with reduced defect density comprising:
   melting a glass composition in an oxy-fuel furnace to form a glass melt wherein the glass melt comprises more than 0.045 weight percent of water based on the total weight of the glass melt; and
   pouring the glass melt into a float glass chamber having a molten metal bath, the float glass chamber comprising:
   an inlet and an outlet;
   a hot section adjacent the inlet and a cold section adjacent the hot section,
   delivering a first gas to the hot section having less than 1 volume percent hydrogen, wherein the atmosphere in the hot section is controlled such that the volume percent of hydrogen in the hot section is less than 1% hydrogen by volume;
   delivering a second gas to the cold section having less than 10 volume percent hydrogen, wherein a first temperature of the molten glass in the hot section is higher than a second temperature of the molten glass in the cold section; and
   controlling the atmosphere in the hot and cold sections such that the volume percent of hydrogen in the cold section is higher than that in the hot section,
   wherein the defect density of the glass is less than 1 total defect per 100 square feet.

2. The method according to claim 1, wherein the temperature of the molten glass in the hot section is greater than 2100° F. and the temperature of the molten glass in the cold section is less than or equal to 2100° F.

3. The method according to claim 1, wherein the temperature of the molten glass in the hot section is greater than 1800° F. and the temperature of the molten glass in the cold section is less than or equal to 1800° F.

4. The method according to claim 1, wherein the temperature of the molten glass in the hot section is greater than 1600° F. and the temperature of the molten glass in the cold section is less than or equal to 1600° F.

5. The method according to claim 1, wherein the hot section has a length in the range of 90 feet to 100 feet from where the molten glass is introduced into the float glass chamber.

6. The method according to claim 5, wherein the cold section has a length in the range of 70 feet to 140 immediately after the hot section.

7. The method according to claim 1, including adding less than 1 volume percent of hydrogen in the cold section.

8. The method according to claim 1, wherein the glass melt comprises:
   from 65 to 75 weight percent $SiO_2$;
   from 10 to 20 weight percent $Na_2O$;
   from 5 to 15 weight percent CaO;
   from 0 to 5 weight percent MgO;
   from 0 to 5 weight percent $Al_2O_3$;
   from 0 to 5 weight percent $K_2O$; and
   from 0 to 2 weight percent $Fe_2O_3$,
   with weight percents being based on the total weight of the glass composition.

9. The method according to claim 1, wherein the first gas delivered to the hot section has zero volume percent of the hydrogen.

10. The method according to claim 1, wherein there is 0 standard cubic feet per hour of hydrogen delivered to the hot section.

11. A method for making float glass with reduced defect density comprising:

melting a glass composition in an oxy-fuel furnace to form a glass melt comprising more than 0.045 weight percent of water based on the total weight of the glass melt; and pouring the glass melt into a float glass chamber having a molten metal bath, the float glass chamber comprising:
- an inlet and an outlet;
- a hot section adjacent the inlet and a cold section, adjacent the hot section,
- wherein a first temperature of the molten glass in the hot section is higher than a second temperature of the molten glass in the cold section,
- delivering a gas to the hot section having less than 1 volume percent hydrogen, wherein an atmosphere in the hot section comprises less than 1 percent hydrogen based on volume;
- delivering another gas to the cold section having less than 10 volume percent hydrogen, and
- controlling the atmosphere in the hot and cold sections such that the volume percent of hydrogen in the cold section is higher than that in the hot section.

12. The method according to claim 11, wherein the temperature of the molten glass in the hot section is greater than 2100° F. and the temperature of the molten glass in the cold section is less than or equal to 2100° F.

13. The method according to claim 11, wherein the hot section has a length in the range of 90 feet to 100 feet from where the molten glass is introduced into the float glass chamber.

14. The method according to claim 11, wherein the cold section has a length in the range of 70 feet to 140 immediately after the first chamber section.

15. The method according to claim 11, including adding less than 1 volume percent of hydrogen in the cold section.

16. The method according to claim 11, wherein the gas delivered to the hot section has zero volume percent of the hydrogen.

17. The method according to claim 11, wherein there is 0 standard cubic feet per hour of hydrogen delivered to the hot section.

18. A method for making float glass with reduced defect density comprising:

melting a glass composition in an oxy-fuel furnace to form a glass melt comprising more than 0.045 weight percent of water based on the total weight of the glass melt; and pouring the glass melt into a float glass chamber having a molten metal bath, the float glass chamber comprising:
- an inlet and an outlet;
- a hot section adjacent the inlet and a cold section adjacent the hot section,
- wherein the hot section has a length in the range of 90 feet to 100 feet from the inlet, wherein the cold section has a length in the range of 70 feet to 140 feet immediately after the first chamber section, and wherein a temperature of the molten glass in the hot section is higher than the temperature of the molten glass in the cold section,
- delivering a gas to the hot section having less than 1 volume percent hydrogen wherein an atmosphere in the hot section comprises less than 1 percent hydrogen based on volume, and delivering another gas to the 1 cold section having less than 3 volume percent hydrogen, and
- controlling the atmosphere in the first and second chamber sections such that the volume percent of hydrogen in the cold section is higher than that in the hot section; wherein the defect density of the glass is less than 1 total defect per 100 square feet.

19. The method according to claim 18, wherein the gas delivered to the hot section has zero volume percent of the hydrogen.

20. The method according to claim 18, wherein there is 0 standard cubic feet per hour of hydrogen delivered to the hot section.

* * * * *